United States Patent
Du et al.

(10) Patent No.: US 9,756,638 B2
(45) Date of Patent: Sep. 5, 2017

(54) METHOD FOR TRANSMITTING SECURITY INFORMATION BASED ON VEHICULAR NETWORK

(71) Applicant: SHANGHAI RESEARCH CENTRE FOR WIRELESS COMMUNICATIONS, Shanghai (CN)

(72) Inventors: Jinlin Du, Shanghai (CN); Bin Zhou, Shanghai (CN); Jing Xu, Shanghai (CN); Wei Zou, Shanghai (CN); Zhenhong Li, Shanghai (CN); Haifeng Wang, Shanghai (CN)

(73) Assignee: SHANGHAI RESEARCH CENTRE FOR WIRELESS COMMUNICATIONS, Shanghai (CN)

( * ) Notice: Subject to any disclaimer, the term of this patent is extended or adjusted under 35 U.S.C. 154(b) by 164 days.

(21) Appl. No.: 14/652,113

(22) PCT Filed: Dec. 10, 2013

(86) PCT No.: PCT/CN2013/088949
§ 371 (c)(1),
(2) Date: Jun. 13, 2015

(87) PCT Pub. No.: WO2014/090131
PCT Pub. Date: Jun. 19, 2014

(65) Prior Publication Data
US 2015/0305038 A1    Oct. 22, 2015

(30) Foreign Application Priority Data
Dec. 14, 2012  (CN) .......................... 2012 1 0545980

(51) Int. Cl.
*H04W 72/04*  (2009.01)
*H04W 48/12*  (2009.01)
(Continued)

(52) U.S. Cl.
CPC ....... *H04W 72/0453* (2013.01); *H04W 4/008* (2013.01); *H04W 48/12* (2013.01);
(Continued)

(58) Field of Classification Search
None
See application file for complete search history.

(56) References Cited

U.S. PATENT DOCUMENTS 5,602,836 A * 2/1997 Papadopoulos ....... H04J 3/1694
370/280
7,333,463 B2 * 2/2008 Park .................... H04W 72/082
370/331
(Continued)

FOREIGN PATENT DOCUMENTS

| CN | 102256322 A | 11/2011 |
|---|---|---|
| CN | 102724764 A | 10/2012 |
| CN | 102780696 A | 11/2012 |

OTHER PUBLICATIONS

Mak, Tony K., "A multi-channel VANET providing concurrent safety and commercial services", Mar. 1, 2005.*

*Primary Examiner* — Ayaz Sheikh
*Assistant Examiner* — Faiyazkhan Ghafoerkhan
(74) *Attorney, Agent, or Firm* — Global IP Services; Tianhua Gu

(57) ABSTRACT

A method for transmitting safety message based on vehicular applied to vehicle-vehicle communication comprising a transmitting side and a receiving side. S1, transmitting a wireless access service announcement information in a conventional vehicle environment to the receiving side, the wireless access service announcement information carrying a temporary safety message transmission channel identifier; S2, transmitting the safety message, and when the a control channel interval is analyzed to have remaining transmissible bytes, dividing the safety message into a first segment to
(Continued)

which a remaining packet mark is appended and a second segment to which a remaining packet mark is not appended, transmitting the first segment to the receiving side during the control channel interval, and transmitting the second segment to the receiving side during service channel interval; and S3, returning to a conventional message transmission state, and continuing transmitting information.

8 Claims, 3 Drawing Sheets

(51) Int. Cl.
*H04W 4/00* (2009.01)
*H04W 12/10* (2009.01)
*H04W 4/04* (2009.01)
*H04L 29/08* (2006.01)

(52) U.S. Cl.
CPC ............. *H04L 67/12* (2013.01); *H04W 4/046* (2013.01); *H04W 12/10* (2013.01)

(56) References Cited

U.S. PATENT DOCUMENTS

| | | | | |
|---|---|---|---|---|
| 8,233,389 B2* | 7/2012 | Yim | ............... | H04L 47/14 370/229 |
| 8,942,253 B2* | 1/2015 | Juan | ............... | H04W 36/06 370/329 |
| 8,995,327 B2* | 3/2015 | Guo | ............... | G08G 1/161 370/312 |
| 9,129,532 B2* | 9/2015 | Rubin | ............... | G08G 1/166 |
| 9,380,427 B2* | 6/2016 | Jodlauk | ............... | H04L 12/1845 |
| 2003/0214933 A1* | 11/2003 | Margon | ............... | H04J 3/1694 370/342 |
| 2005/0202822 A1* | 9/2005 | Park | ............... | H04W 72/082 455/436 |
| 2010/0031042 A1* | 2/2010 | Di Crescenzo | ............... | H04L 63/0869 713/169 |
| 2010/0150120 A1* | 6/2010 | Schlicht | ............... | H04W 4/20 370/338 |
| 2011/0044172 A1* | 2/2011 | Yim | ............... | H04L 47/14 370/236 |
| 2011/0128849 A1* | 6/2011 | Guo | ............... | H04W 28/10 370/235 |
| 2011/0128902 A1* | 6/2011 | Guo | ............... | G08G 1/161 370/312 |
| 2011/0141970 A1* | 6/2011 | Juan | ............... | H04W 36/06 370/328 |
| 2011/0294424 A1* | 12/2011 | Hu | ............... | H04W 72/00 455/41.2 |
| 2011/0294434 A1* | 12/2011 | Hu | ............... | H04W 72/00 455/62 |
| 2011/0306353 A1* | 12/2011 | Kim | ............... | H04W 48/18 455/452.2 |
| 2013/0128801 A1* | 5/2013 | Zhu | ............... | H04W 4/14 370/315 |
| 2013/0260759 A1* | 10/2013 | Choi | ............... | H04W 36/24 455/436 |
| 2015/0195827 A1* | 7/2015 | Feng | ............... | H04W 4/206 380/270 |

* cited by examiner

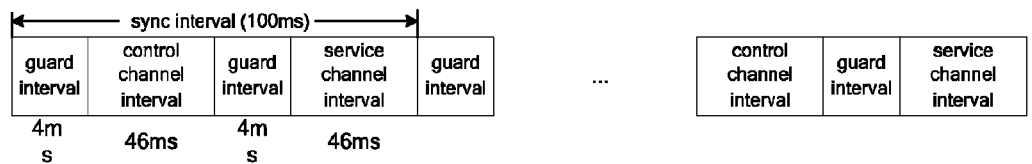
FIG. 1
| source ID | source position |
|---|---|
| serial number ||
| current channel | next channel |
| information content ||
FIG. 2
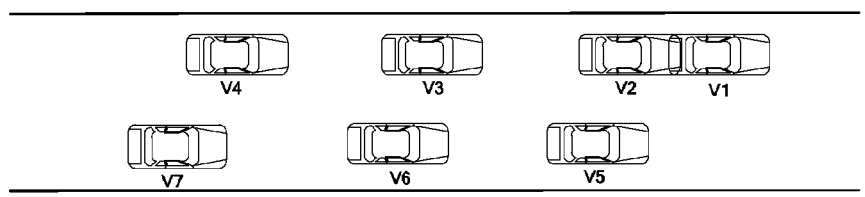
FIG. 3

| WAVE version | times of change | extension field | service information | channel information | WAVE routing announcement | temporary safety message transmission channel |

METHOD FOR TRANSMITTING SECURITY INFORMATION BASED ON VEHICULAR NETWORK

CROSS REFERENCE TO RELATED PATENT APPLICATION

The present application is the US national stage of PCT/CN2013/088949 filed on Dec. 10, 2013, which claims the priority of the Chinese patent applications No. 201210545980.4 filed on Dec. 14, 2012, which applications are incorporated herein by reference.

BACKGROUND OF THE PRESENT INVENTION

Field of Invention

The present invention belongs to the field of vehicular wireless network communication, and relates to a transmission method of safety message, in particular to a method for transmitting safety message based on vehicular network.

Description of Related Arts

Vehicular network communication can improve the comfort level of vehicle driving, reduce the traffic accidents, and has already been an inevitable trend of modern automotive electronic technology development. Vehicular network communication is also a core technology of realizing Intelligent Transport System (ITS for short). A Wireless Access in Vehicular Environments (WAVE for short) system permits the vehicle driving on a frequency band of a Dedicated Short Range Communications (DSRC for short) technology. DSRC is a technology dedicated for vehicle communication internationally, IEEE 802.11p mainly prescribes the standards of a Media Access Control Layer (MAC for short) and a Physical layer (PHY for short) of a DSRC protocol, IEEE 1609 is a high-level standard using 802.11p as a communication protocol, with respect to a communication system architecture and a series of standardized services and interfaces defined when the wireless communication technology is applied to a vehicular environment.

DSRC/WAVE equipment works at a 5.9G frequency band, a working band occupies 75 MHz all together, wherein a guard band occupies 5 MHz, and the remaining 70 MHz is divided into seven 10 MHz channels, including one control channel (CCH for short) and six service channels (SCH for short). However, the time is divided into alternatively switched control channel intervals (CCHI for short) of 50 ms and service channel internals (SCHI for short) of 50 ms. For DSRC/WAVE sync interval as shown in FIG. 1, one CCH interval and one SCH interval (100 ms) form one sync interval, the CCH interval and the SCH interval are separated by guard intervals (GI) of 4 ms and are used for completing channel switching. The CCH channel transmits management message, for example WAVE service announcements and high-priority vehicle safety message, such as collision warning and emergency brake, SAE J2735 standard suggests that the transmission delay of the information of high priority is lower than 10 ms. In view of that information cannot be transmitted and received by single-radio equipment simultaneously in the same channel, WAVE is required to be in the CCH interval and all equipment must monitor the CCH in order to guarantee that all equipment can receive management message and safety message. Moreover, non-safety message is transmitted through the SCH interval. In order to transmit the non-safety message, in the SCH interval, the single-radio equipment has to switch to any one SCH channel from the CCH channels. However, the safety message to be transmitted only waits to be transmitted on the CCH channel when the next CCH interval comes. For the safety message transmission sensitive to delay, greater delay may be introduced in the scheme.

In the prior art, for example, a safety message broadcast mechanism in the vehicular environment is described in "Broadcasting message in multi-channel vehicular networks", US 2011/0128902. It is assumed that information source vehicles can run on one or more channels in the patent. In the vehicular environment, once the vehicle detects that an accident happens in the SCH interval and a piece of safety message corresponding to the accident is generated, which indicates that the information source vehicles are going to broadcast "the current channel" and "the next channel" of the message. The current channel refers to the channel in which the vehicle detects the happening accident and transmits the safety message corresponding to the accident; however, the next (transmission) channel refers to (other) channels in which the source vehicles transmit the safety message afterwards. Neighbor node vehicles of the source vehicles become relay vehicles, and receive broadcast information transmitted from sources. Then, each relay vehicle receiving the safety message repeatedly broadcasts the information on other channels (channels other than "the current channel" and "the next channel"). The format of the transmitted safety message is as shown in FIG. 2. In order to guarantee that all vehicles running on any channels can receive the safety message in the SCH interval, that the same safety message must be repeatedly broadcast on all the channels in the patent certainly will cause great resource losses.

In real life, a scene that an automobile collision happens on a high-speed road is as shown in FIG. 3, for example, an automobile V1 collides with an automobile V2 at a certain moment, if the collision is successfully detected and the corresponding safety message is generated, theoretically, the safety message should be transmitted to surrounding vehicles instantly. However, if the moment of generating the message is at the end of the CCH interval by chance, the time required for transmitting the safety message exceeds the remaining CCH time, and then the message is stored and has an opportunity to be transmitted until the next CCH interval comes. Due to the existence of the SCHI and the guard intervals, the vehicles may return to the CCH interval for information transmission after waiting for 54 ms, while the delay may cause chain collision. Therefore, the delay of 54 ms is too long, and should be shortened.

Moreover, if the safety message is transmitted on the CCH channels in the SCH interval, the WAVE cannot guarantee that all the vehicles can monitor the safety message, since a single-radio vehicle has to switch to the SCH channels from the CCH channels for transmission if the non-safety message of the single-radio vehicle need to be transmitted in the SCH interval. This means that the single-radio vehicle cannot monitor the CCH channels and receive the safety message simultaneously in the SCH interval to cause serious consequences. In spite of this, if that the safety message is received and transmitted by the whole network in the SCH interval can be guaranteed, the transmission delay is greatly shortened, the transmission efficiency of the safety message is improved, and that the safety message is received and transmitted by the whole network in the SCH interval is a problem urgently needing to be solved.

SUMMARY OF THE PRESENT INVENTION

In view of the above disadvantages in the prior art, the present invention aims to provide a method for transmitting safety message based on vehicular networks, which is used for solving the problems that the transmission delay of the safety message is too long, the transmission efficiency is lower and the safety message cannot be received and transmitted in the SCH in the prior art.

In order to realize the purposes and other related purposes, the present invention provides a method for transmitting safety message based on vehicular networks, and the method for transmitting the safety message is applied to vehicle-to-vehicle communication comprising a transmitting side and a receiving side. The method for transmitting safety message comprises:

S1, transmitting WAVE (Wireless Access in Vehicular Environments) service advertisement information carrying a temporary safety message transmission channel identifier in a conventional vehicle environment to the receiving side;

S2, transmitting the safety message, and when a control channel interval is analyzed to have remaining transmissible bytes, dividing the safety message into a first segment to which a remaining packet mark is appended and a second segment to which a remaining packet mark is not appended, transmitting the first segment to the receiving side during the control channel interval, and transmitting the second segment to the receiving side during service channel interval;

and S3, returning to a conventional message transmission state, and continuing transmitting information.

Preferably, the step S1 further comprises: appointing a temporary safety message transmission channel for the service channel interval, and appending the temporary safety message transmission channel information to the WAVE service advertisement information in the conventional vehicle environment.

Preferably, the step S2 further comprises:

S21, analyzing how many remaining bytes capable of being transmitted in the control channel interval if the transmitting side of the safety message does not have enough time to completely transmit the whole safety message at the end of the control channel interval;

S22, dividing the safety message into two segments, namely the first segment and the second segment, appending the remaining packet mark to the first segment, and transmitting the first segment carrying the remaining packet mark in the control channel interval;

and S23, switching to the temporary safety message transmission channel in the service channel interval after a guard interval, without resource competition at the beginning of the service channel interval, the transmitting side directly transmitting remaining safety message, namely the second segment; meanwhile, all of the receiving side suspending message channel competition, and receiving the segment of the remaining safety message.

Preferably, the remaining packet mark is appended to the first segment so as to prove that the whole safety message cannot be completely transmitted in the remaining time of the control channel interval.

Preferably, the information of temporary safety message transmission channel is appended to the WAVE Service Advertisement information in the conventional vehicle environment to form a shortened WAVE service advertisement information in a vehicle environment.

Preferably, a service channel can transmit the safety message and non-safety message.

Preferably, the WAVE Service Advertisement information and high-priority safety message can be transmitted in the control channel interval.

Preferably, the information content of the temporary safety message transmission channel comprises a channel identifier (ID in short).

Preferably, the remaining safety message is transmitted through the appointed temporary safety message transmission channel in the service channel interval.

Preferably, that the control channel is analyzed to have remaining transmissible bytes indicates that the safety message cannot be completely transmitted in the control channel interval.

As mentioned above, the method for transmitting the safety message based on vehicular network of the present invention has the following beneficial effects:

1) the transmission delay of the safety message is greatly reduced;
2) the conflict probability is cut down, and the transmission delay is further reduced;
3) the frequency spectrum efficiency is improved;
and 4) the radio resource is effectively utilized.

BRIEF DESCRIPTION OF THE DRAWINGS

FIG. 1 illustrates a sync interval schematic diagram of a dedicated short range communication technology/wireless access system.

FIG. 2 illustrates a format schematic diagram of safety message transmitted in a service channel interval.

FIG. 3 illustrates a schematic diagram of a scene that automobiles collide on a high-speed road.

DETAILED DESCRIPTION OF THE PREFERRED EMBODIMENTS

Embodiments of the present invention are described by the following specific examples. Those skilled in the art can easily understand other advantages and effects of the present invention from the content disclosed by the description. The present invention may also be implemented or applied through other different specific embodiments. Details in the description may be modified or altered on basis of different opinions and application without departing from the spirit of the description.

Reference can be made to the drawings. It should be noted that, figures provided by the embodiments only illustratively present the basic ideas of the present invention, so the figures only show components related to the present invention without in accordance with the number, shape and size of components for actual implementation. The shape, number and scale of each component may be changed according to requirement during actual implementation, thus layout of the components may be more complicated.

Figures 4, 5A:
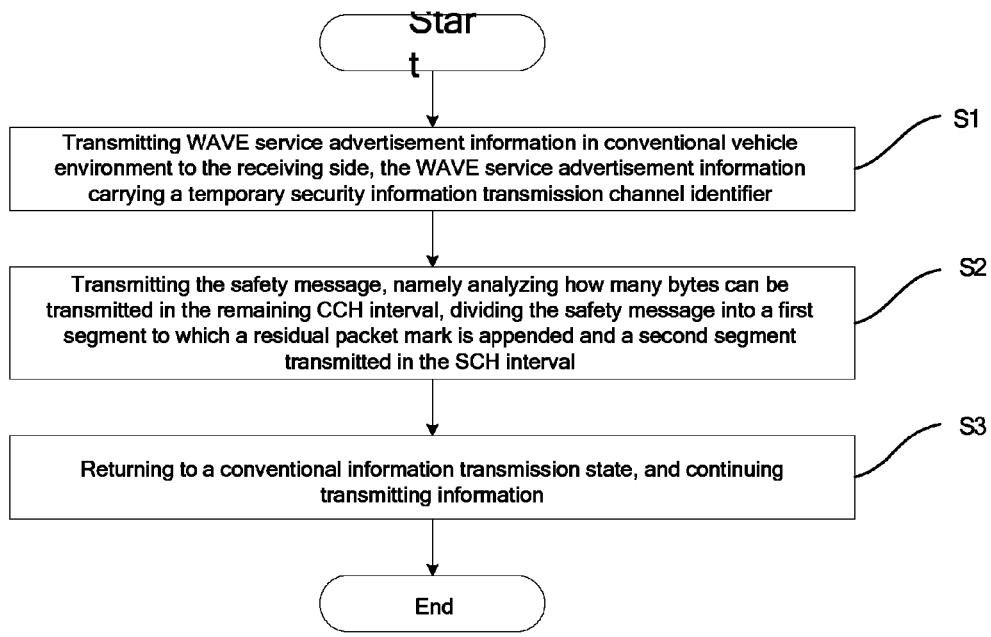
FIG. 4 illustrates a flow diagram of a method for transmitting the safety message based on vehicular network of the present invention.
FIG. 5a illustrates a frame format schematic diagram of the wireless access service announcement information carrying temporary safety message transmission channel information in a conventional vehicle environment in the method for transmitting the safety message based on vehicular network of the present invention.
Figure 5B:
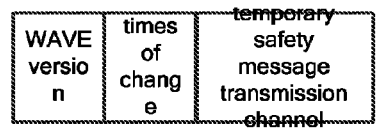
FIG. 5b illustrates a frame format schematic diagram of the wireless access service announcement information in shortened vehicular environment in the method for transmitting safety message based on vehicular network of the present invention.

The present invention is different from US 2011/0128902 in that the safety message needs to be transmitted repeatedly on all of the SCH in the United States Patent US 2011/0128902, while in the present invention, the safety message can be transmitted by utilizing CCH interval as much as possible, if the safety message cannot be completely transmitted on the CCH, all vehicles are informed to receive the remaining safety message (the information format is as shown in FIG. 5a or FIG. 5b) on an appointed any one of SCHs, and meanwhile the vehicle receiving the remaining safety message suspends resource competition in the SCH interval until the transmission of the remaining safety message is completed.

The detailed description of the present invention is further provided in conjunction with the following embodiments and drawings.

In the vehicle environment, information is transmitted through network nodes and mainly is divided into management message, safety message and non-safety message. According to a standard protocol of the vehicle environment, the management message and the safety message are transmitted on a control channel (CCH for short) in control channel intervals (CCHI for short), and the non-safety message is transmitted on a service channel (SCH for short) in the service channel intervals (SCHI for short). When there is information to be issued from a network node, the node firstly obtains resources through channel competition, and if the resources are successfully obtained, the node broadcasts the information.

The method for transmitting the safety message based on vehicular network of the present invention requires the vehicular network to meet two assumed conditions:

(1) the vehicle transmitting side knows whether a piece of safety message or WSA (Wireless Access in Vehicular Environments Service Announcement) information can be completely transmitted in the remaining time in the control channel interval;

and (2) the vehicle transmitting side can divide the safety message into two packet segments for independent transmission.

Therefore, based on above assumption, the embodiment provides a method for transmitting the safety message based on vehicular network, and the method for transmitting the safety message is applied to vehicle-vehicle communication comprising a transmitting side and a receiving side. As shown in FIG. 4, the method for transmitting the safety message comprises:

S1, transmitting a wireless access service announcement information in a conventional vehicle environment to the receiving side, the wireless access service announcement information carrying a temporary safety message transmission channel identifier; The vehicular network protocol requires that the wireless access service announcement information, namely the WSA information, in the vehicle environment and the high-priority safety message can be transmitted in the control channel interval. In order to facilitate distinguishing, the WSA message prescribed by the current vehicle standard protocol in the embodiment is referred to as the wireless access service announcement information in a conventional vehicle environment. In order to guarantee that the safety message can be transmitted instantly in any time slot (including the SCH interval), the step further comprises appointing a temporary safety message transmission channel for the SCH interval, and appending the information of temporary safety message transmission channel to the wireless access service announcement information in the conventional vehicle environment, and then broadcasting the information to inform other vehicles that the CCH channel is switched to the appointed SCH channel in the one or more subsequent SCH intervals, so that all of the vehicles in the SCH interval can continue to monitor the safety message on the same SCH channel. It is to be noted that the appointed transmission channel can be any one of SCH channels. In the SCH interval, the SCH channel can transmit the safety message and non-safety message.

As shown in FIG. 5a, the information of temporary safety message transmission channel is appended to the wireless access service announcement information in the conventional vehicle environment to form wireless access service announcement information in a shortened vehicle environment as shown in FIG. 5b. Wherein, the information content of the temporary safety message transmission channel can be extremely brief, for example, only the channel ID is included. The frame format of the wireless access service announcement information in the shortened vehicle environment as shown in FIG. 5b can be used for transmitting the temporary safety message transmission channel information. The vehicle receiving the temporary safety message transmission channel information is switched to the appointed SCH channel in the subsequent SCH interval (possibly including one SCH interval or possibly including a plurality of SCH intervals). In the SCH interval, after all of the vehicles are switched to the same SCH channel, the safety message can be successfully received and transmitted in the SCH interval.

In a traditional safety message transmission method, in the CCH interval, the safety message can be completely transmitted in the CCHI if there is enough time to transmit the entire safety message. If a piece of safety message cannot be completely transmitted in the remaining time, the transmitting side waits for the coming of the next CCH interval so as to continue transmitting the information, since the safety message not completely transmitted has a transmission opportunity only until the next CCH interval comes. In the embodiment, the remaining safety message is transmitted through the appointed temporary safety message transmission channel in the SCH interval.

Figure 6:
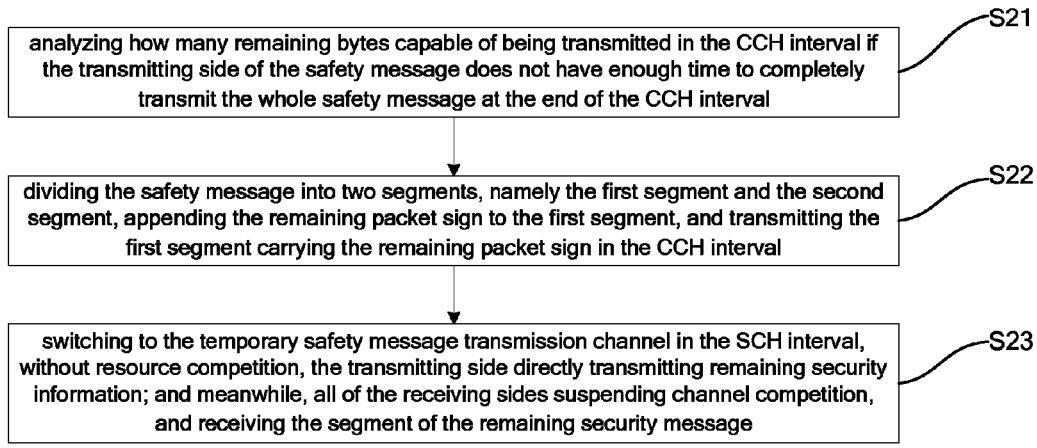
FIG. 6 illustrates a flow diagram of the step S2 in the method for transmitting safety message based on vehicular network of the present invention.

S2, transmitting the safety message after receiving the WSA information carrying the temporary safety message transmission channel, and after the control channel is analyzed to have how many remaining transmissible bytes, which indicates that the safety message cannot be completely transmitted in the CCH interval, dividing the safety message into a first segment to which a remaining packet mark is appended and a second segment to which a remaining packet mark is not appended, transmitting the first segment to the receiving side during the CCH interval, and transmitting the second segment to the receiving side during service channel intervals. Specifically, the step S2 as shown in FIG. 6 comprises:

S21, analyzing how many remaining bytes capable of being transmitted in the CCH interval if the transmitting side of the safety message does not have enough time to completely transmit the whole safety message at the end of the CCH interval;

S22, dividing the safety message into two segments, namely the first segment and the second segment, appending the remaining packet mark to the first segment, and transmitting the first segment carrying the remaining packet mark in the CCH interval to the receiving side; wherein the purpose of appending the remaining packet mark to the first segment is to prove that the whole safety message cannot be completely transmitted in the remaining time of the CCH interval.

S23, all of the vehicles switching to the temporary safety message transmission channel in the SCH interval in the guard interval, without resource competition, the transmitting side directly transmitting remaining safety message, namely the second segment to which the remaining packet mark is not appended, to the receiving side, meanwhile, all of the receiving sides suspend channel competition and receives the segment of the remaining safety message.

and S3, all of the vehicles returning to a conventional message transmission state, and continuing transmitting information.

The method for transmitting the safety message based on vehicular network of the present invention firstly greatly reduces the transmission delay of the safety message. It is assumed that the safety message can be generated by the network in the SCH interval. If the safety message is generated in the CCH interval but the information cannot be completely transmitted in the CCH interval, the transmission delay reaches at least 54 ms (including the guard interval) according to the existing protocol standard. It is assumed that the time slot of the network is 1 ms, when the generated message is generated on the k-th time slot in the SCH interval, the delay of which is at least (54-k)ms since the safety message cannot be transmitted in the SCH interval. Therefore, the average transmission delay is at least $$\sum_{i=0}^{50}(54-i)/50 = 29.58 \text{ ms}.$$

However, if the present invention is used, the guard interval is abandoned, and the safety message can be immediately transmitted. Thus, the method can accelerate the transmission speed of the safety message, and reduces the delay. Secondly, the conflict probability is cut down, and the transmission delay is further reduced. In the present invention, when a part of the safety message can be transmitted in the remaining time of the CCH interval, the transmitting side of the information source transmits partial safety message carrying the remaining packet mark, and after channel switching, the transmitting side switches to the appointed temporary safety message transmission channel and continues transmitting the remaining safety message. Under the circumstance, all of the receiving sides can suspend the resource competition in the primary stage of the SCH interval, so that the conflict probability is cut down. Further, the present invention fully utilizes CCH interval to transmit safety message, so as to reduce the byte number of the safety message transmitted in the SCH interval as much as possible, and thus the transmission delay of the security information is further reduced safety message. Finally, the method improves the frequency spectrum efficiency. The present invention requires that the safety message is transmitted only on the appointed temporary safety message transmission channel when it is transmitted in the SCH interval. The safety message does not need to be broadcasted repeatedly on a plurality of channels. Thus, the frequency spectrum efficiency is improved.

In conclusion, the present invention effectively overcomes the drawbacks in the prior art and exhibits a high utilization value in the industry.

The above embodiments only exemplarily illustrate the principles and effects of the present invention and are not intended to limit the present invention. Those skilled in the art may modify or change the above embodiments without departing from the spirit and scope of the present invention. Hence, all equivalent modifications or variations made by those having ordinary skill in the art without departing from the spirit and technical ideas of the present invention should still be covered by claims of the present invention.

What is claimed is:

1. A method for transmitting a safety message based on vehicular network, the method being applied to vehicle-vehicle communication comprising a transmitting side and a receiving side, the method for transmitting the safety message successively comprises:
    S1, transmitting a wireless access service announcement information in a conventional vehicle environment to the receiving side, the wireless access service announcement information carrying a temporary safety message transmission channel identifier; appointing a temporary safety message transmission channel for a service channel interval;
    S2, transmitting the safety message, and when a control channel interval is analyzed to have remaining transmissible bytes, dividing the safety message into a first segment to which a remaining packet mark is appended and a second segment to which a remaining packet mark is not appended, transmitting the first segment to the receiving side during the control channel interval, and transmitting the second segment to the receiving side during service channel interval;
    Wherein, the step S2 further comprises:
    S21, analyzing how many remaining bytes capable of being transmitted in the service channel interval if the transmitting side of the safety message does not have enough time to completely transmit the whole safety message at the end of the service channel interval;
    S22, dividing the safety message into two segments, namely the first segment and the second segment, appending the remaining packet mark to the first segment, and transmitting the first segment carrying the remaining packet mark in the service channel interval;
    and S23, switching to the temporary safety message transmission channel in the service channel interval in a guard interval, without resource competition, the transmitting side directly transmitting remaining safety message, namely the second segment; meanwhile, all of the receiving side suspending channel competition, and receiving the segment of the remaining safety message.

2. The method for transmitting the safety message based on vehicular network according to claim 1, wherein the remaining packet mark is appended to the first segment so as to prove that the whole safety message cannot be completely transmitted in the remaining time of the control channel interval.

3. The method for transmitting the safety message based on vehicular network according to claim 1 wherein the information of the temporary safety message transmission channel is appended to the wireless access service announcement information in the conventional vehicle environment to form the wireless access service announcement information in a shortened vehicle environment.

4. The method for transmitting the safety message based on vehicular network according to claim 1 wherein a service channel can transmit the safety message and non-safety message.

5. The method for transmitting the safety message based on vehicular network according to claim 1 wherein the wireless access service announcement information and high-priority safety message can be transmitted in the control channel interval.

6. The method for transmitting the safety message based on vehicular network according to claim 1 wherein the temporary safety message transmission channel comprises a channel ID.

7. The method for transmitting the safety message based on vehicular network according to claim 1 wherein a remaining safety message is transmitted through the appointed temporary safety message transmission channel in the service channel interval.

8. The method for transmitting the safety message based on vehicular network according to claim 1 wherein the control channel is analyzed to have remaining transmissible bytes indicates that the safety message cannot be completely transmitted in the control channel interval.

* * * * *